United States Patent [19]

Bruch

[11] Patent Number: 4,514,034
[45] Date of Patent: Apr. 30, 1985

[54] METHOD FOR MANUFACTURING A WAVEGUIDE SWITCH INCLUDING THE FORMATION OF BEADS OR CRIMPS TO ALIGN A PAIR OF OPTICAL FIBERS

[75] Inventor: Helmut Bruch, Berlin, Fed. Rep. of Germany

[73] Assignee: Siemens Aktiengesellschaft, Berlin and Munich, Fed. Rep. of Germany

[21] Appl. No.: 416,332

[22] Filed: Sep. 9, 1982

[30] Foreign Application Priority Data

Sep. 29, 1981 [DE] Fed. Rep. of Germany ....... 3138709

[51] Int. Cl.³ .......................... G02B 7/26; G02B 5/14
[52] U.S. Cl. .............................. 350/96.20; 350/96.21; 350/96.10
[58] Field of Search ............... 350/96.10, 96.15, 96.16, 350/96.20, 96.21; 250/227

[56] References Cited

U.S. PATENT DOCUMENTS

| 4,152,043 | 5/1979 | Albanese | 350/96.20 |
| 4,189,206 | 2/1980 | Terai et al. | 350/96.20 |
| 4,318,587 | 3/1982 | Grassl | 350/96.20 |
| 4,355,862 | 10/1982 | Kock | 350/96.2 |
| 4,368,948 | 1/1983 | Despouys | 350/96.2 |

FOREIGN PATENT DOCUMENTS

| 2903867 | 8/1980 | Fed. Rep. of Germany | 350/96.20 |
| 55-156903 | 12/1980 | Japan | 350/96.20 |
| 1426475 | 2/1976 | United Kingdom | 350/96.20 |

OTHER PUBLICATIONS

Rawson et al., "A Fiber Optical Relay for Bypassing Computer Network Repeaters", Optical Eng., vol. 19, No. 4, Jul./Aug./80, pp. 628-630.
Comerford, "Fiber-Optic Bypass Switch", IBM Tech. Disclosure, vol. 21, No. 10, 3/79, pp. 4280-4281.

*Primary Examiner*—William L. Sikes
*Assistant Examiner*—Brian M. Healy
*Attorney, Agent, or Firm*—Hill, Van Santen, Steadman & Simpson

[57] ABSTRACT

A method for producing a switch for opening and closing optical connections between two end faces of an optical waveguide characterized by securing the two waveguides on a carrier part and a movable tongue with their end faces aligned and in contact with each other and then either deforming the tongue or a connecting piece, which connects the tongue to the carrier part to move the end of the tongue with the attached waveguide away from an edge of the carrier plate. In the preferred embodiment the tongue and part are integrally connected together by at least one integral stay which has been provided with a shallow bead which is pressed flat after securing the waveguides to the tongue and carrier plate to cause the desired spacing between the end faces of the waveguide.

1 Claim, 2 Drawing Figures

METHOD FOR MANUFACTURING A WAVEGUIDE SWITCH INCLUDING THE FORMATION OF BEADS OR CRIMPS TO ALIGN A PAIR OF OPTICAL FIBERS

BACKGROUND OF THE INVENTION

The present invention is directed to a method for manufacturing a switch for opening and closing an optical connection between fiber optical waveguides.

A switch for fiber optical waveguides is disclosed in U.S. Pat. No. 4,318,587 which was based on German application 2,903,848. The switch disclosed in this patent has a rigid carrier part on which a fiber optical waveguide end is secured and has a transversely deflectable optical waveguide which is secured on a flexible switch tongue. The switch tongue and the fixed or stationary carrier part are connected by means of a common connecting piece or base body. The two end surfaces of the fiber optical waveguides which face one another exhibit a slight spacing relative to one another. This spacing is of significance to enable free play of the switch tongue. However, the spacing should be kept as low as possible in order to keep attenuation losses as small as possible.

It is a standard procedure in the manufacturing of switches to first abut the two fiber optical waveguides and then to pull them apart to a slight degree prior to securing them in their given positions. Thereby, it is difficult to precisely set the spacing which should only amount to a few micrometers. If one attempts to hold a thin foil between the end surfaces when the fiber optical waveguides are abutted, then the foil becomes pinched between the end faces and can be torn when removed so that a remanent remains between the fiber optical waveguide ends. Moreover, the foil cannot be produced with different thicknesses so that the spacing cannot be reduced as desired.

SUMMARY OF THE INVENTION

The present invention is directed to providing a method which will obtain a very small spacing with low dimensional tolerances between the end faces of two fibers in an optical switch.

To achieve these objects, the present invention is directed to a method for manufacturing a switch for opening and closing an optical connection between two end faces of a pair of fiber-optical waveguides wherein one of the waveguides is a stationary waveguide that is attached to a carrier part which is rigidly fixed in the switch and the other waveguide is a movable waveguide that is attached to a flexible switch tongue with an end face of the waveguide being spaced a predetermined amount from an end face of the stationary waveguide and the switch has connecting means for interconnecting the switch tongue to the carrier part. The method comprises the steps of providing a carrier part, a flexible switch tongue and connecting means for interconnecting the switch tongue and carrier part with the switch tongue being movable relative to the carrier part by transverse deflection, securing a first waveguide on the carrier part with an end face being adjacent one edge of said carrier part, securing a second waveguide on the tongue with an end face of the second waveguide being aligned and engaged with the end face of the first waveguide, and then slightly deforming one of said switch tongues and connecting means to move an end of the switch tongue and the end face of the second waveguide a predetermined distance away from the one edge of the carrier plate and the end face of the first waveguide.

A very slight longitudinal movement in the manner of a toggle arrangement is produced by means of deformation in either the switch tongue or the pieces forming the connecting means and in a direction, which is perpendicular to the longitudinal direction of the optical waveguides. Since this movement is produced in the direct proximity of the fiber-optical waveguide ends, it can be very directly transferred to the corresponding location. As a result of the possibility of precisely obtaining a conceivable, slight spacing with low outlay, a mutual contacting of the end faces of the fiber-optical waveguide can be reliably avoided and attenuation losses can be kept extremely low.

A process for securing fiber-optical waveguides to switch tongues and to a carrier part are known and an example is disclosed in a British published patent specification 1,426,475. In this method, a fiber-optical waveguide, which had been previously annularly scored, is then secured to a movable tongue and a carrier part and then is smoothly separated by means of lifting up the switch tongue relative to the carrier part. However, this method, as disclosed in this patent, does not teach or suggest how the required spacing between the end faces or surfaces of the fiber-optical waveguides is produced. In such an instance, the spacing can be precisely set with the assistance of the method of the present invention.

One embodiment of the method of the present invention is that the connecting piece forming the connecting means is stretched by means of pinching. A very slight stretching can be achieved by means of a narrow impression in the connecting place to cause the desired spacing between the end of the tongue and the one edge of the carrier part.

In another embodiment, a shallow bead or crimp which extends transverse to the longitudinal direction of the carrier tongue is formed in the tongue to cause the end of the tongue to be spaced from the one edge of the carrier.

In a preferred embodiment of the method, a shallow bead is formed in the connecting pieces of the connecting means prior to the optical waveguides being secured onto both the tongue and the carrier plate. After securing the waveguides with their end faces in contact and aligned with each other, the bead is then pressed flat. This method is particularly desirable when the carrier part, the tongue and the connecting means are provided as a single piece having a plurality of slots formed therein to create the tongue connected to the carrier part by at least one integral stay. Preferably, the slots form a pair of integral stays, which conduct the base of the tongue to the carrier plate and the shallow bead is formed in both stays to extend transversely to the longitudinal direction of the tongue. After securing the waveguides to the tongue and carrier plate with the end faces in contact and aligned, the beads are pressed flat to be removed and thus to increase the spacing between the end of the tongue and the one edge as well as between the two end faces to the desired amount. A very precise and slight longitudinal motion of the waveguide end faces relative to one another can be achieved by selecting the size of the shallow bead.

DESCRIPTION OF THE PREFERRED EMBODIMENTS

Figure 1:
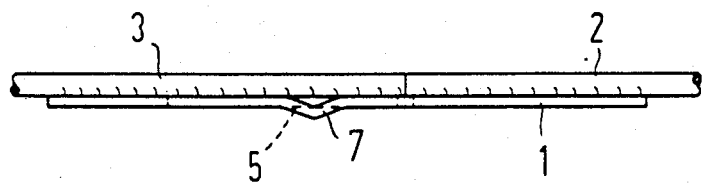
FIG. 1 is a side view of the preferred embodiment of the present invention.
Figure 2:
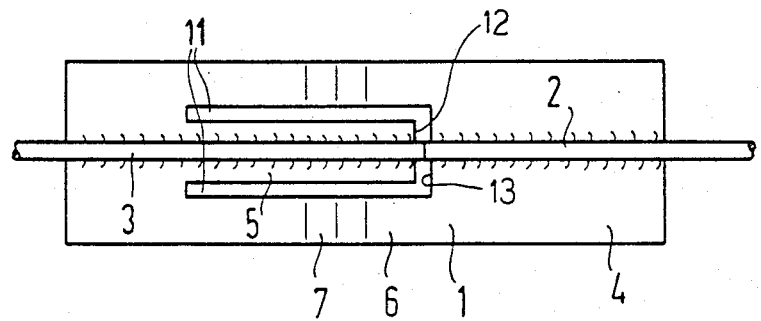
FIG. 2 is a plan view of the arrangement of FIG. 1.

The principles of the present invention are particularly useful for manufacturing a switch for opening and closing an optical connection between two end faces of a pair of fiber optical waveguides 2 and 3 which are illustrated in FIGS. 1 and 2. The switch will have one of the waveguides 2 and 3 as a stationary waveguide 2 which is attached to a carrier plate or part 4 which is rigidly fixed in the switch and the other waveguide 3 is a movable waveguide that is attached to a flexible switch tongue 5 with the end faces of the waveguide 3 and 2 being aligned and spaced apart a predetermined amount. For example, the switch can be the same as disclosed in the above mentioned U.S. Pat. No. 4,318,587, whose disclosure is incorporated by reference thereto and will have connecting means for interconnecting the carrier plate to the switch tongue with the desired spacing therebetween.

In the embodiment illustrated in FIGS. 1 and 2, a single plate-like member 1 has a plurality of slots 11 which form the tongue 5 which is integrally connected to the plate 4 by a pair of lateral connecting stays 6. Prior to completing the connection of the stationary waveguide 2 to the plate 4 and the waveguide 3 to the tongue 5, shallow beads or crimps 7, which extend transverse to the longitudinal direction of the tongue 5 are formed in each of the stays 6 to decrease the spacing between an end 12 of the tongue and one edge 13 of the plate 4. The two waveguides 2 and 3 are secured on their respective portions with their end faces abutting each other and with the waveguide being in axial alignment such as by gluing. After the glue or adhesive has hardened, the switch tongue 5 with the movable filter optical waveguide 3 cannot move freely relative to the end of the stationary fiber 2. However, after the glue has dried, a slight deformation applied to each shallow bead 7 on the connecting stays 6 will press the beads flat to increase the spacing between the end 12 of the tongue 5 and the one edge 13 and also to obtain a spacing between the end faces of the two fibers 2 and 3. This slight deformation such as pressing the beads 7 flat will pull the two fibers apart a precisely defined amount. As a result, a slight, free space between the two end faces of the fiber-optical waveguides 2 and 3 will occur to allow movement of the tongue 5. This reliable mechanical separation of the two fiber-optical waveguide end faces is achieved and will provide a very low attenuation loss.

Instead of pressing the beads 7 to flatten them out, it is possible to create a transverse bead or crimp in the tongue 5 after the attachment of the fibers 2 and 3. However, it should be noted that the fiber cannot be secured in the area of the tongue 5 in which the bead is formed.

It is also possible instead of flattening the beads 7 in each of the stays, to pinch or deform a portion of the stays 6 to cause an elongational stretching therein to obtain the desired spacing. Such a pinching would reduce the thickness of the stay to cause an increased length for each of the integral stays 6.

Although various minor modifications may be suggested by those versed in the art, it should be understood that I wish to embody within the scope of the patent granted hereon, all such modifications as reasonably and properly come within the scope of my contribution to the art.

I claim:

1. A method for manufacturing a switch for opening and closing an optical connection between two end faces of a pair of first and second fiber-optical waveguides wherein the first waveguide is a stationary waveguide that is attached to a carrier part which is rigidly fixed in the switch and the second waveguide is a movable waveguide that is attached to a flexible switch tongue with an end face of the waveguide being spaced a predetermined amount from an end face of the stationary waveguide, said switch having connecting means for interconnecting the switch tongue to the carrier part, the method comprising the steps of providing a single piece having a plurality of slots formed therein to create the tongue having an end being connected to the carrier part by at least one integral stay with the end of the tongue being spaced from one edge of the carrier part; then forming a shallow bead in each stay extending transverse thereto to cause the end of tongue to move toward the one edge of the carrier part; securing the first waveguide on the carrier part with an end face being adjacent said one edge of said carrier part; securing the second waveguide on the tongue with an end face of the second waveguide being aligned and engaged with the end face of the first waveguide; and then pressing the shallow bead out of each of the integral stays to cause the end of the switch tongue and the end face of the second waveguide to move a predetermined distance away from the one edge of the carrier part and the end face of the first waveguide.

* * * * *